INVENTOR.
Herbert L. Hartman
BY
ATTORNEYS.

Nov. 29, 1960

H. L. HARTMAN 2,961,883

PHONOGRAPH DRIVE MECHANISM

Filed Dec. 12, 1958

INVENTOR.
Herbert L. Hartman
BY
Slough & Slough

ATTORNEYS.

Nov. 29, 1960 H. L. HARTMAN 2,961,883
PHONOGRAPH DRIVE MECHANISM
Filed Dec. 12, 1958 7 Sheets-Sheet 3

INVENTOR.
Herbert L. Hartman
BY
Slough & Slough
ATTORNEYS.

Nov. 29, 1960 H. L. HARTMAN 2,961,883
PHONOGRAPH DRIVE MECHANISM
Filed Dec. 12, 1958 7 Sheets-Sheet 5

INVENTOR.
Herbert L. Hartman
BY
Slough & Slough
ATTORNEYS.

Nov. 29, 1960   H. L. HARTMAN   2,961,883
PHONOGRAPH DRIVE MECHANISM
Filed Dec. 12, 1958   7 Sheets-Sheet 6

INVENTOR.
Herbert L. Hartman
BY
Slough & Slough
ATTORNEYS.

United States Patent Office 2,961,883
Patented Nov. 29, 1960

2,961,883
PHONOGRAPH DRIVE MECHANISM

Herbert L. Hartman, Elyria, Ohio, assignor to The General Industries Company, Elyria, Ohio, a corporation of Ohio Filed Dec. 12, 1958, Ser. No. 779,963

20 Claims. (Cl. 74—200)

My invention relates to plural speed phonograph turntable driving mechanisms and relates more particularly to improvements in the selecting or controlling means for such speed changes.

An object of my invention is to provide improved means for manually selecting and effecting the drive of a phonograph turntable at a desired speed.

A further object of my invention is to provide speed change control means for a phonograph having the control member thereof centrally disposed with respect to the turntable.

A still further object of my invention is to provide a device as set forth above which is readily shiftable to drive the turntable at a given speed while the driving mechanism is in operation.

Yet another object of my invention is to provide such a mechanism which is shiftable by means associated with the spindle regardless of whether or not a record is mounted upon said spindle.

Additionally, it is an object of my invention to provide a mechanism having all of the above features and which includes simple means rotatable by the controller at the spindle for shifting a part of said mechanism to different horizontal levels.

Another object of my invention is to provide a device as set forth above which includes speed indicating means on the spindle located controller.

A still further object of my invention is to provide a phonograph turntable driving mechanism of the above type wherein all of the operating parts thereof, including the turntable spindle, are adaptable to be unitarily mounted upon a single mounting member.

Another object of my invention is to provide a device of the type referred to which is compact, comprised of but few parts, inexpensive, and highly durable and efficient in use.

These and further objects of my invention will become readily apparent from the following specification and the appended drawings, in which said drawings.

My invention which comprises speed selecting and control means preferably associated with a turntable spindle is applied, in the forms illustrated herein, to a plural speed turntable driving mechanism generally of the type adapted to drive a turntable having a circumferentially continuous depending flange by means of a spring biased horizontally floating idler wheel interposed between a vertically disposed rotor shaft, having a plurality of pulley driving portions of different diameters thereon, and the said turntable flange. The idler wheel shown herein is provided with a vertically, as well as horizontally, movable mount whereby said idler wheel can be disposed at the different levels of the pulley driving portion to effect desired speed changes.

According to the modifications shown, the vertical movement of the idler wheel mount and therefore of the idler wheel is accomplished preferably through means of a rotatable cam adapted to contact a cam follower carried by the idler wheel mount, the cam being moved by means of a control means associated with the turntable spindle, although it is within the scope of my invention to reverse the cam and cam follower, or substitute other linkage for raising and lowering the said idler wheel, as described and shown in my copending application for United States Letters Patent, Serial No. 779,882, filed December 11, 1958 if desired. It is also within the scope of my invention to differently dispose the turntable driving means.

Referring now to the drawings, in all of which like parts are designated by like reference characters, and referring now more particularly to the first embodiment of my invention as shown in Figs. 1 to 6 inclusive, at 1 I show a turntable mounting plate having a portion cut away, as indicated at 2, to form an irregular aperture beneath and within which the motor mounting plate 3 of my invention is preferably disposed. The driving mechanism itself is preferably unitarily mounted upon a motor mounting plate 3 having upwardly offset, laterally projecting ears 4, 5, and 6 by which said motor mounting plate is adapted to be mounted to the turntable mounting plate 1. The ear members 4 and 5 and portions of the ear member 6 project laterally beyond the aperture 2 to underlie the turntable mounting plate 1. Resilient grommets G are disposed within suitable aligned apertures in the turntable mounting plate 1 and the ear members 4, 5, and 6 and bolts 7 are projected therethrough whereby said motor mounting plate 3 is resiliently suspended beneath the main mounting plate.

The power source for driving the phonograph turntable comprises an electric motor M resiliently mounted beneath the motor mounting plate 3 by means of elongated motor mounting bolts 8 projected through suitable rubber grommets G' disposed within said apertures in said motor mounting plate 3. The motor M is provided with a vertically disposed rotor shaft 9 which, in the various modifications of my invention herein illustrated, projects through a circular opening 10 in the motor mounting plate 3 and is provided at its uppermost end with pulley driving portions of different diameters, viz. 11, 12, 13, and 14. Said pulley driving portions are, in the form shown, successively upwardly and inwardly stepped to form driving peripheries of different sizes to drive the turntable at different speeds.

Figure 1:
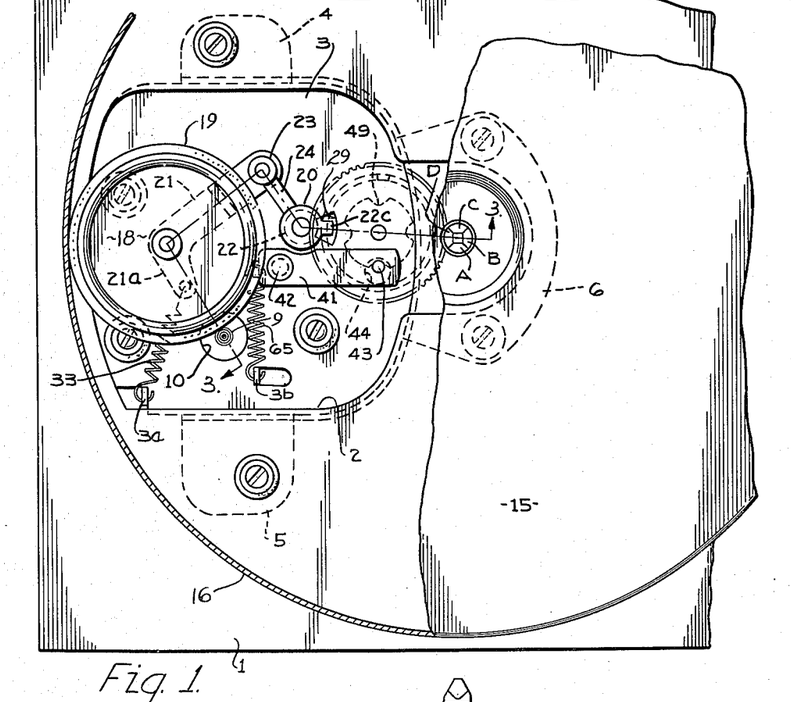
Fig. 1 is a top plan view of one embodiment of my invention showing the turntable thereof in partial section.
Figure 2:
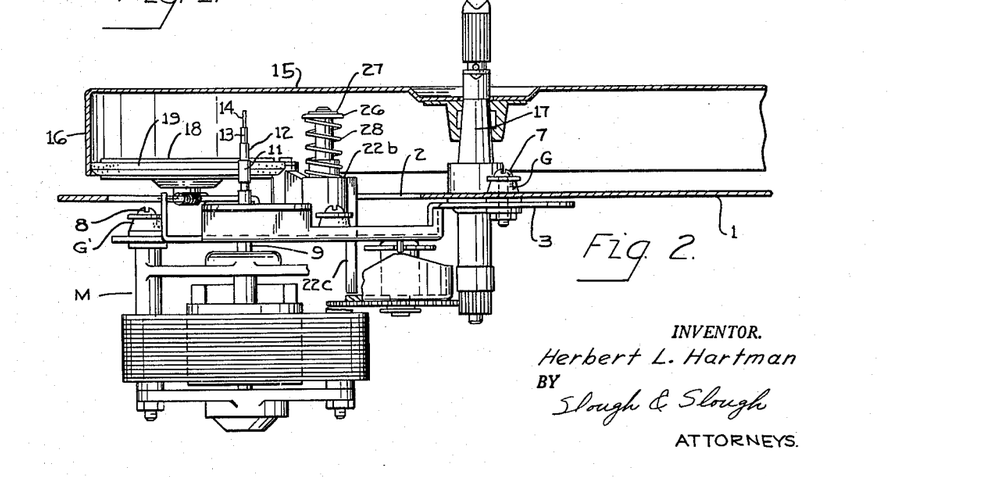
Fig. 2 is a side plan view showing the turntable and primary mounting plate thereof in section.

The turntable, indicated at 15 in Figs. 1 and 2, is provided with a circumferential depending flange 16 and is rotatably mounted upon a turntable spindle 17 preferably journaled rotatably upon a spindle bearing 35 mounted upon the arcuate ear 6 of the motor mounting plate 3. The turntable 15 overlies and is spaced slightly upwardly from the driving mechanism and the flange 16 thereof is spaced a substantial distance from the driving pulley portions 11, 12, 13, and 14 of the rotor shaft 9. An idler wheel 18 preferably having a circumferentially extending resilient pheripheral tread 19 thereon is disposed to contact one of the steps of the rotor shaft 9 and the turntable flange 16 as best shown in Figs. 1 and 2, to transfer driving torque from said rotor shaft to the turntable.

Figures 3, 4, 5, 6:
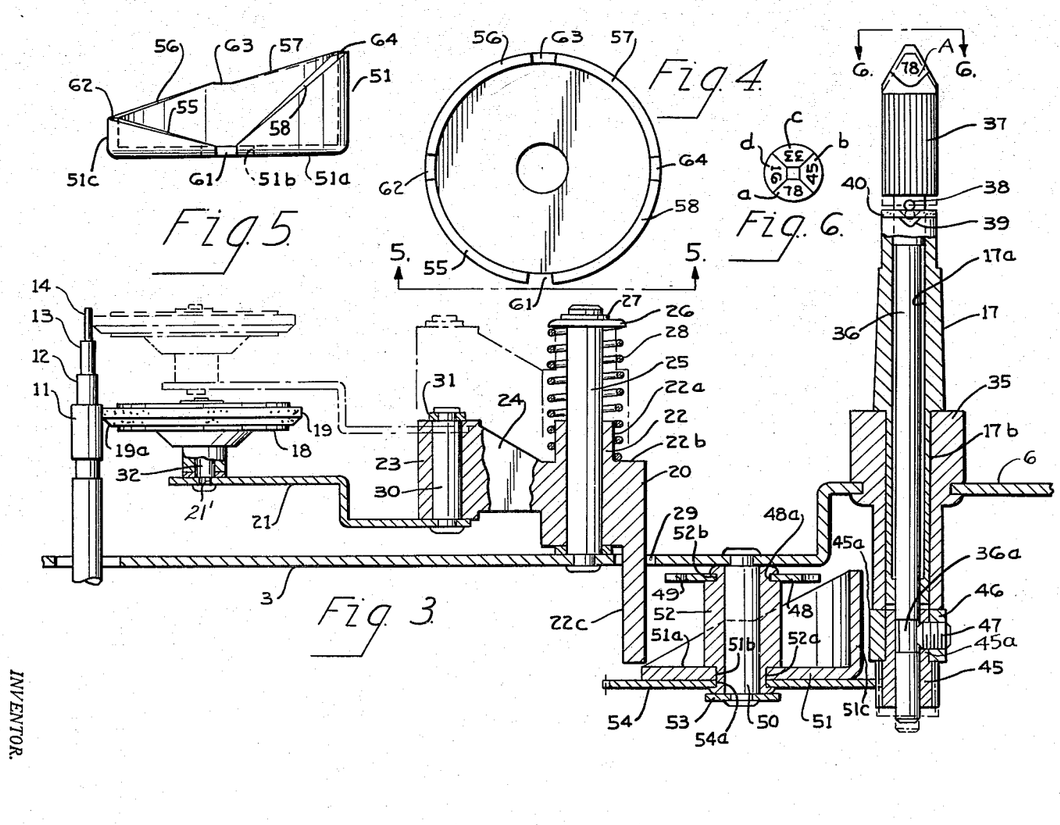
Fig. 3 is a sectional view taken along the line 3—3 of Fig. 1.
Fig. 4 is a top plan view of the cam used in this first embodiment.
Fig. 5 is a side elevation of the cam of Fig. 4 as seen from the direction of line 5—5 in Fig. 4.
Fig. 6 is a top plan view of the spindle controller as viewed from the line 6—6 in Fig. 3.

As best shown in Figs. 1 and 3, the mounting means for the idler wheel 18 comprise a toggle link 20 and an articulated arm 21. The toggle link 20 comprises a pair of axially parallel and interspaced bearing portions 22 and 23 integrally united by means of an upwardly tapered web portion 24. The bearing 22 is, in the form shown, of relatively larger dimension than the bearing 23 and is slidably and rotatably mounted upon a vertically up-standing stud 25 riveted or otherwise suitably rigidly mounted on the motor mounting plate 3. The stud 25 is longer than the bearing 22 and projects upwardly therefrom. It is provided at its uppermost end with a slightly cupped, radially outwardly projecting retainer 26 telescoped over said stud and maintained thereon by means of a snap ring 27. A coil spring 28 is compressively interposed between a shoulder 22b provided by the junction of an upwardly reduced sleeve portion 22a of the bearing 22 and the retainer 26. Said bearing 22 is also provided with a laterally disposed vertically downwardly projecting cam follower portion 22c which projects downwardly below the motor mounting plate 3 through an arcuate slot 29 in said plate.

The relatively smaller bearing 23 is spaced upwardly from the uppermost surface of the motor mounting plate 3, as shown in solid lines in Fig. 3, when the bearing 22 is in its lowermost position, and the articulated stepped arm 21 is pivotally mounted upon said bearing 23 by means of a vertically upwardly projecting pivot pin 30 rigidly secured at one end of said arm 21, as shown. The pivot pin 30 interfits the bearing 23 whereby the arm 21 abuts the lowermost surface of said bearing 23 and is suitably maintained within said bearing by means of a snap ring 31 provided at the uppermost end thereof in a well-known manner. The idler wheel 18 is journaled upon an upwardly extending portion of the lever arm 21 by means of a vertically upstanding rigidly mounted pivot pin 32 projected through an aperture 21' in the arm 21 and extends upwardly thereof at the end opposite the pivot pin 30. In the embodiment illustrated, the idler wheel lies, in the solid and dotted line portions of Fig. 3 within the horizontal plane of the bearing 23.

As best shown in Fig. 1, the arm 21 is provided with a laterally inwardly projecting finger portion 21a disposed adjacent the pivot pin 32 to which one end of a small coil spring 33 is attached. The opposite end of the spring 33 is hooked over an upwardly bent anchor member 3a integrally formed with and disposed at an edge of the motor mounting plate 3. The spring 33 is preferably adapted to resiliently urge the idler wheel 18 into driving engagement with the rotor shaft 9 and the turntable flange 16. It will be understood from the foregoing that the idler wheel 18 is horizontally movable in any direction due to the pivotal mounting of the toggle link 20 upon the stud 25 and the articulation of the arm 21 relative to said toggle link. It will also be understood that the idler wheel 18 is vertically movable by vertical movement of the bearing 22 which is slidable upon the stud 25 and that the upward movement of said toggle link is opposed by the spring 28 which resiliently urges the link in a downward direction.

The turntable spindle 17 shown in Figs. 1 and 6, is concentrically apertured, as indicated at 17a, and is provided at the lowermost end thereof with a diametrically reduced journal portion 17b. The journal portion 17b is rotatably mounted within a bearing 35 rigidly mounted upon the ear 6. A manually operable control rod 36, having an enlarged serrated grip portion 37 disposed at the uppermost end thereof, is telescoped within the bore 17a of the spindle 17 and is adapted to be slidably and rotatably moved with respect thereto. Immediately below the grip portion 37, the control rod 36 is provided with a transverse, radially projecting clutch pin 38 adapted to interfit diametrically oppositely aligned grooves or notches 39 disposed in the uppermost edge of the spindle 17. A resilient washer 40 manufactured of rubber, neoprene or the like material is preferably interposed between the clutch pin 38 and the notches 39 whereby said pin is resiliently urged away from said notches and the grip portion 37 is disposed slightly upwardly thereof. It will be readily seen that by pressing the control rod 36 downwardly until the clutch pin 38 engages the notches 39, the rod 36 and the spindle 17 can be caused to rotate in unison. It will also be understood, that when said control rod is released the pin 38 is lifted out of the notches 39 by the washer 40 thereby raising said control rod to its original position. The purpose of the above described clutching feature between the control rod 36 and the spindle 17 will be hereinafter more fully set forth and described.

The lowermost end of the control rod 36 is provided with a pinion 45. Said pinion is telescoped upon the lower end of said control rod, the uppermost end of said pinion being provided with a collar 45a press fitted within a retainer ring 46. A set screw 47 is thread fitted through the retainer ring 46 and the collar 45a and adapted to abut the control rod 36 at a reduced waist portion 36a thereof, whereby said pinion rotates unitarily with the manual rotation of said control rod at the knurled grip end.

Intermediate the spindle 17 and the toggle link pivot stud 25, a vertically downwardly projecting, elongated pivot pin 50 is secured to the mounting plate 3. A hub 52 is carried by said pin and a cam 51 is rotatably mounted thereon. The pivot pin 50 is rigidly secured to the motor mounting plate 3 in any suitable manner as by riveting, and the downwardly directed end of said pivot pin is provided with a snap ring retainer 53 to maintain the hub 52 and the cam 51 against vertical displacement relative to said pivot pin.

The cam 51 in the form of my invention, shown in Figs. 1 to 6 inclusive, is preferably formed of flat sheet metal and comprises a flat circular base 51a having a centrally disposed aperture 51b therein and a relatively perpendicularly disposed, upwardly projecting camming wall portions 51c. The cam 51 is seated within a necked-in portion 52a of the hub 52. A gear 54 centrally apertured at 54a is also seated within the portion 52a, and said cam and said gear are rigidly and unitarily mounted upon the hub 52 by rolling the extreme end of said hub over said gear in a well-known manner.

The cam 51 is so disposed that the peripheral wall 51c thereof underlies and is adapted to abut the downwardly projecting cam follower 22c carried by the toggle link bearing 22. At the same time, the gear 54 disposed beneath the cam intermeshes with the pinion 45 carried by the spindle associated means whereby said cam is adapted to be rotated to a preferred camming position by manually controlled rotative movements of the control rod 36.

By referring to Fig. 5, it will be noted that the peripheral walls 51c of the cam 51 are of irregular height forming a plurality of circumferentially successively higher cam surfaces in a clockwise direction. Said cam surfaces are indicated successively at 55, 56, 57 and 58, the last mentioned cam 58 being a descending rather than an ascending cam surface, the lowermost end thereof being adjacent to and of the same height as the lowermost end of the first mentioned cam surface 55. Referring to Fig. 4, a horizontal land surface 62 is provided between the uppermost end of the cam surface 55 and the lowermost end of the cam surface 56. In like manner, a land 63 is provided between the cam surfaces 56 and 57, and a land 64 is interposed between the uppermost end of the cam 57 and the uppermost end of the descending cam 58. Between the lowermost end of the cam 55 and the lowermost end of the cam 58, said cam surfaces are at the level of the base 51a at which point the bearing 22 of the toggle link 20 rests upon the uppermost surface of the motor mounting plate 3 and the cam follower 22c is suspended a slight distance above said face of the cam. This point in the cam represents the starting point of the cam and is represented at the notch 61 between the cam surfaces 55 and 58.

The lowermost point of the cam as shown at 61 is a position at which the idler wheel 18 contacts the lowermost and largest of the pulley driving portions 11 whereby said idler wheel drives the turntable at 78 r.p.m. Rotation of the control rod 36 in a clock-wise direction by means of the grip portion 37 causes the cam 51 to rotate in a counterclockwise direction whereby the ascending cam surface 55 passes beneath the cam follower 22c to raise the toggle link and therefore the idler wheel upwardly. The land 62 represents the level at which the idler wheel 18 contacts the pulley drive portion 12 to drive the turntable at 45 r.p.m. Continued movement of the control rod 36 brings the cam follower 22c to the level of the land 63 whereby the idler wheel is disposed to contact the pulley driving portion 13 to drive the turntable at 33 r.p.m. The land 64 represents the highest point to which the idler wheel 18 is raised whereby it contacts the uppermost and smallest pulley driving portion 14 to drive the turntable at 16 r.p.m. After passing the land 64, the cam follower 22c rides down the descending cam surface 58, the toggle link 20 being resiliently urged and aided to move downwardly by means of the spring 28. It will be understood that the entire mounting means for the idler wheel 18 would tend to move downwardly in response to the pull of gravity but that the spring 28 assures a more positive action.

As best seen in Fig. 3, it will be noted that the uppermost end of the grip portion 37 is generally pyramid shaped to provide four flat, tapering surfaces directed outwardly at 90° apart. Each of these surfaces has imprinted thereupon a number which corresponds to one of the speeds at which it is desired to rotate the turntable, viz. "78," "45," "33," "16." In installing the present drive mechanism in a phonograph, the grip portion 37 would preferably be so directed that a predetermined one of said flat surfaces A, B, C, and D would face in a direction corresponding to some predetermined point on the record player to indicate to the operator the speed at which the turntable 15 is operating. For example, if the surface A, indicating 78 r.p.m. is facing in a predetermined direction in the view of the operator, the toggle link 20 will be in its lowermost position, and the idler wheel 18 will be in contact with the pulley driving portion 11 to drive the turntable at the indicated speed. The ratio between the pinion 45 and the gear 54 is such that to move the cam 51 rotatively 90° the control rod 36 must be rotated 1¼ turns. It will be readily seen, therefore, that by rotating the control rod 36 1¼ turns, the land 62 will be brought beneath the cam follower 22b, the idler wheel will be raised to the level of the pulley drive portion 12, and the surface B, indicating 45 r.p.m. will be brought into the proper speed indicating position. It will also be understood that successive turntable speeds can be obtained by rotating the grip portion 37 the proper number of turns to bring the succeeding speed indicating numbers at C and D into view of the operator. The operator may, of course, rotate the control rod 36 in a counterclockwise direction if he so desires to make the required speed changes.

During the upward movement of the idler wheel 18, the peripheral tread 19 moves inwardly to contact each successively smaller step in response to pull from the spring 33. During its downward movement, said idler wheel is aided in moving outwardly over each step of the successively larger pulley drive portions by the lowermost beveled surface 19a of said tread. These vertical movements of the idler wheel 18 are preferably made while the turntable is rotating. When moving downwardly against the steps of the pulley drive portion, rotative motion of the turntable and of the idler wheel in conjunction with the beveled surface 19a of the idler wheel tread enables the idler wheel to crawl or climb over each step easily and without distortion of said tread.

Speed changes made when the turntable is not power operated are effectively accomplished by pressing the clutch pin 38 into the notches 39 thereby causing both the spindle 17 and the turntable 15 to rotate 1¼ turn during the speed change movement. Rotation of the turntable causes a corresponding rotation in the idler wheel 18 and the movement of the peripheral tread 19 from one step pulley driving portion to another is accomplished smoothly and easily.

To assist the operator in locating each desired speed and corresponding cam position, I preferably provide detent means in the form of an arm 41 pivotally mounted upon the uppermost surface of the motor mounting plate 3 by means of a pin or pivot 42 projecting through one end thereof. The opposite end of the arm 41 is provided with a downwardly directed detent pin 43 adapted to project downwardly through an aperture 44 in the motor mounting plate to a position adjacent a generally circular detent cam 48 mounted upon the uppermost end of the hub 52. The cam 48 is provided upon its outer periphery with peripheral notches 49 disposed preferably at 90° intervals about the detent. The cam 48 is further centrally apertured at 48a and telescoped over a necked-in portion 52b of the hub 52 and said hub is preferably provided with a rolled-over end portion adapted to retain the detent 48 thereon in a well-known manner. A coil spring 65 is connected at one end to the opposite end of the arm 41 adjacent the pin mounting 42 and at another end to an upwardly directed lug or anchor 3b of the motor mounting plate 3 whereby said detent arm is effectively biased in a counterclockwise direction to bring the detent pin 43 into abutting relationship with the detent cam 48 at the periphery thereof. As each speed change is made and the hub 52 rotates, the detent cam carried thereby is caused to rotate and the pin 43 snaps into one or another of the notches 49 thereby offering resistance to further rotation of the control rod 36 and indicating to the operator that the speed change has been made.

The second embodiment of my invention as illustrated in Figs. 7–11 inclusive, is basically similar to the first embodiment of Figs. 1–6 inclusive in all respects except in the specific cam mechanism used. As in the first embodiment, I provide a primary mounting plate designated at 70 having a portion thereof cut away as indicated at 71 to expose the operating parts of the speed shift change mechanism which are mounted unitarily upon a motor mounting plate 72 resiliently suspended beneath the primary mounting plate 70. The motor mounting plate 72, as in the first embodiment of my invention, is provided with a plurality of upwardly offset, laterally projecting ear members 73, 74, and 75 by which said primary motor mounting plate is secured to the primary mounting plate by means of bolts 76 and cushioning grommets G2. The motor M2 is resiliently suspended beneath the motor mounting plate 72 by means of bolts 77 and rubber grommets G2' in a manner similar to that shown on the first embodiment of my invention.

The motor M2 is provided with a vertically upwardly projecting rotor shaft 79 having upwardly stepped, progressively smaller, pulley driving portions 81, 82, 83 and 84. As in the first embodiment of my invention, the idler wheel 85 is mounted upon an articulated arm 86 pivotally mounted through one end of a toggle link 87 mounted upon an upwardly directed stud 88 rigidly mounted to the motor mounting plate 72. The uppermost end of the stud 88 is provided with a retainer 89 and a snap ring 90 similar to the retainer 26 and the snap ring 27 of the first embodiment of my invention, and a coil spring 91 seated on the retainer 89 and upon the link 87 biases the toggle link 87 in a downward direction. Said toggle link is also provided with a downwardly directed cam follower 92 projecting downwardly through an aperture 78 in the motor mounting plate 72 whereby the lowermost end of said cam follower is adapted to contact upwardly directed peripheral cam surfaces of a circular cam 100. The turntable spindle indicated at 93 is provided with a diametrically reduced journal portion 93a rotatably interfitting a bearing 94 rigidly mounted to the ear member 75. The spindle 93 is provided with a concentric bore 93b into which is rotatably fitted a control rod 101.

Figures 9, 10, 11:
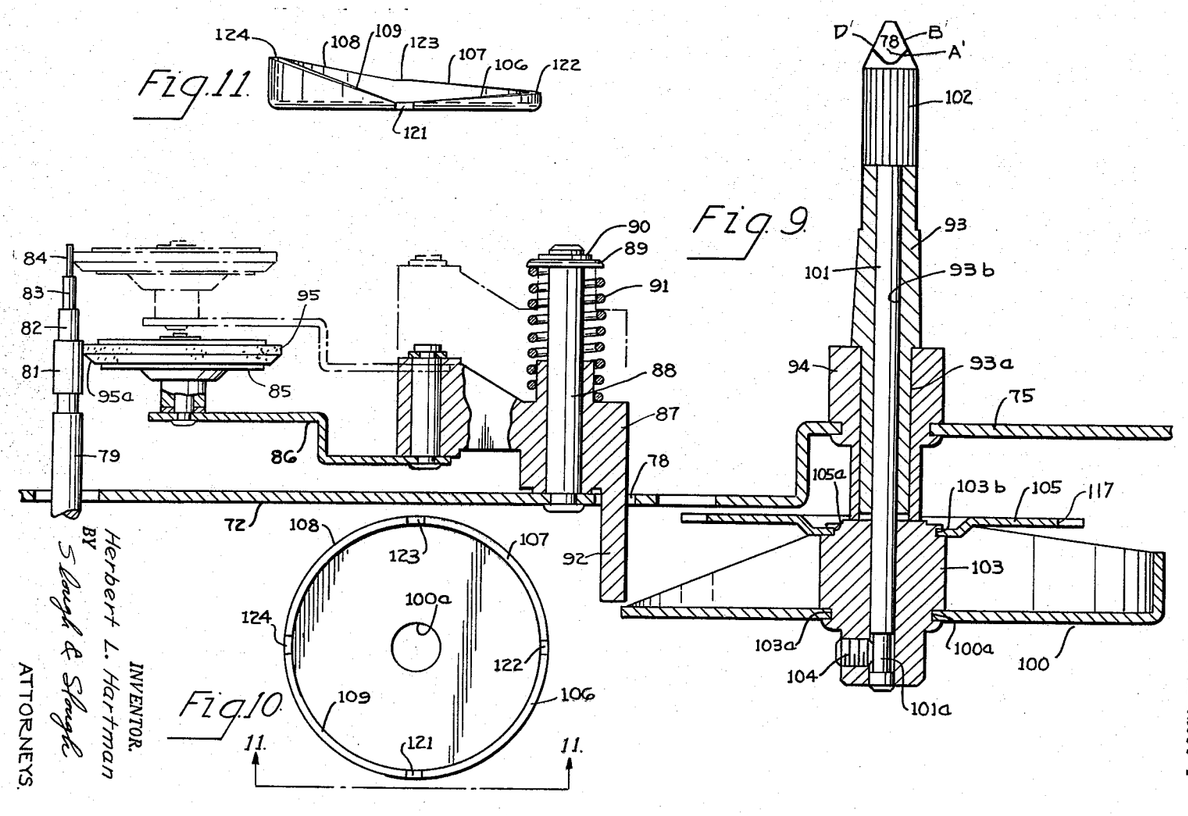
Fig. 9 is a view taken along the line 9—9 of Fig. 7.
Fig. 10 is a top plan view of the cam of the second embodiment of my invention.
Fig. 11 is a side elevation of the cam as shown in Fig. 10 and viewed from the line 11—11 of Fig. 10.

Referring now particularly to Fig. 9, the control rod 101 is provided with an enlarged, serrated upper end portion 102 adapted for manually gripping and rotating said control rod. The grip portion 102 is shaped similar to the grip portion 37 of the first embodiment of my invention whereby it provides a plurality of flat surfaces having speed indicating numbers, such as 78, 45, 33 and 16 imprinted thereon, and indicate A', B', C', and D' respectively.

The cam 100, centrally apertured at 100a, is rigidly secured to a concentric hub 103 mounted upon the control rod 101 and disposed immediately below the bearing 94, and is preferably telescoped over a reduced portion 103a intermediate the ends of the hub 103, a portion of said hub being rolled over the said cam to secure it in place in a conventional manner. A set screw 104 is thread fitted into the hub 103 and abuts a diametrically reduced portion 101a at the lowermost end of the control rod 101 whereby said hub and the cam 100 are rigidly secured to rotate with said control rod. The uppermost end of the hub 103 is preferably provided with a detent cam, centrally apertured at 105a. of basically similar design to the detent cam 48 of the first embodiment of my invention and said cam 105 is mounted upon a reduced portion 103b of said hub and provided with a plurality of notches 117 spaced circumferentially 90° apart.

Figure 7:
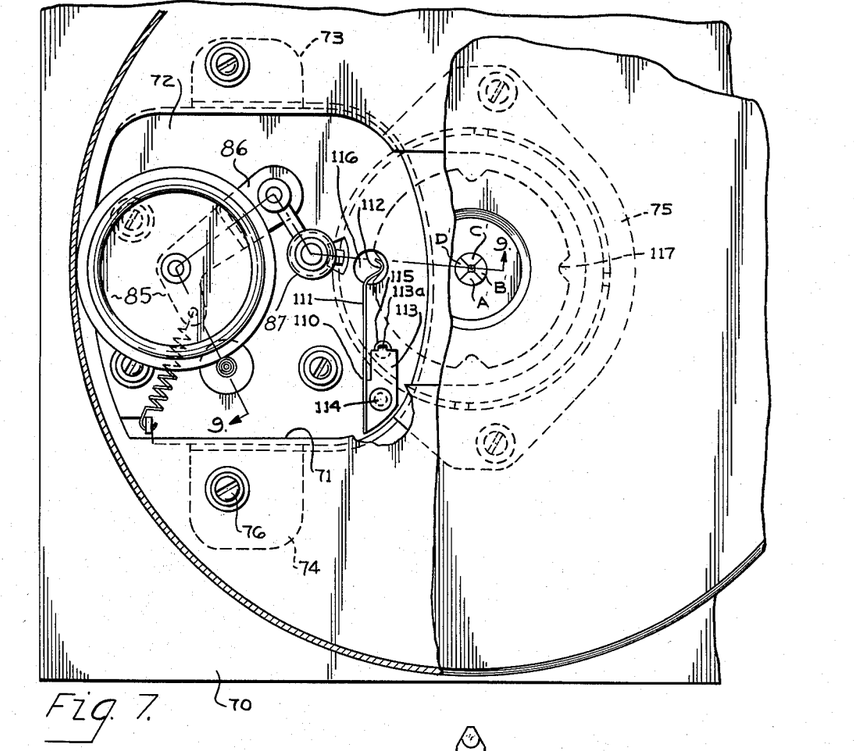
Fig. 7 is a top plan view similar to Fig. 1 of a second embodiment of my invention.
Figure 8:
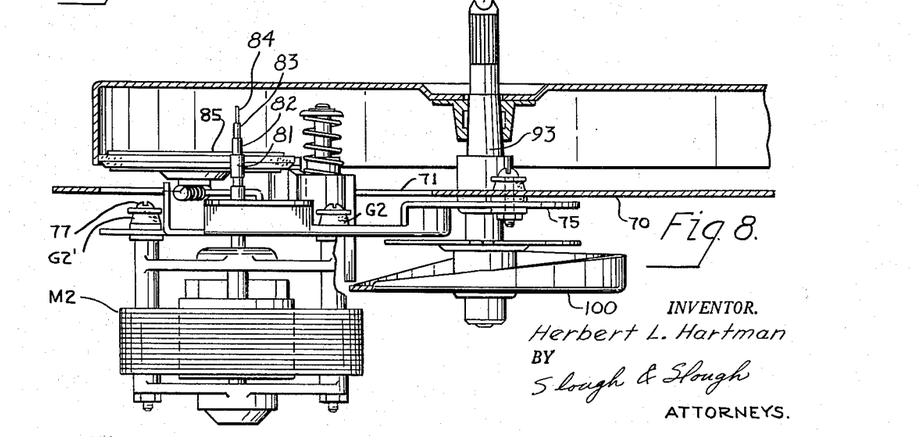
Fig. 8 is a view similar to Fig. 2 of the second embodiment of my invention as shown in Fig. 7.

As best shown in Fig. 7, a spring detent 110 is mounted upon the uppermost surface of the motor mounting plate 72, as hereinafter described. Said detent 110 comprises a flexible arm 111 preferably formed of flat sheet metal terminating at one end thereof in a generally hook-shaped detent portion 112. The flexible arm portion 111 is disposed in a vertical plane and is provided with a right angularly disposed mounting base 113 at the end thereof opposite the detent hook 112. In the form shown, the mounting base is riveted to the motor mounting plate 72 by means of a rivet 114 and is provided with a downwardly directed lug 113a projecting through an aperture 115 in the motor mounting plate 72 to prevent the spring detent 110 from pivoting about the rivet 114. The detent hook 112 extends downwardly from the arm portion 111 through an opening 116 in the motor mounting plate 72 and is resiliently urged into contact with the detent cam 105 and by means of the spring detent 110 and the detent cam 105, the cam 100 is releasably retained at four points on the circumference thereof.

It will be noted that the cam 100 is provided with a peripherally upstanding wall portion 100a, the upper surface of which is so contoured as to raise the toggle link 87 and dispose the idler wheel 85 at different vertical levels. As best shown in Figs. 10 and 11, the lowermost portion of the cam is indicated at 121 wherein the toggle link 87 rests on the uppermost surface of the motor mounting plate 72 and the lowermost end of the cam follower 92 is spaced slightly above the cam 100. In this position, the idler wheel 85 is disposed at a level whereby it contacts the lowermost relatively largest pulley drive portion 81 and is thereby adapted to drive the turntable at 78 r.p.m. Proceeding in a counterclockwise direction around the cam 100 a plurality of lands 122, 123, and 124 are provided disposed at 90° intervals, and said lands correspond to the pulley drive portions 82, 83, and 84 respectively. At each respective land, the idler wheel 85 is disposed at the proper level to contact the corresponding pulley drive portion to drive the turntable at different rotative speeds. Land 122 and pulley drive portion 82 correspond to the 45 r.p.m. speed, land 123 and pulley drive portion 83 correspond to 33 r.p.m., and the land 124 and the relatively smaller and uppermost pulley drive portion 84 correspond to the rotative speed of 16 r.p.m. An ascending cam surface 106 connects the 78 r.p.m. position, indicated at 121, to the land 122, and ascending cam surfaces 107 and 108 connect the lands 122, 123, and 124 respectively in a counterclockwise direction. Descending cam surface 109 connects the land 124 with the lowermost 78 r.p.m. position as indicated at 121.

It will be understood from the foregoing description that the idler wheel 85 is successively moved upwardly or downwardly by rotating the control rod 101. If said rod is rotated in a clockwise direction from a starting point at the lowermost 78 r.p.m. speed, as illustrated in Fig. 9, the toggle link 87 and therefore the idler wheel 85 will be raised by the cam surface 106 to the level of the second driving speed 45 r.p.m. on the land 122. Further rotation will raise the idler wheel 85 to the next pulley drive portion by means of the cam surface 107 whereby the cam follower 92 is positioned above the land 123. Further movement in a clockwise direction will raise the idler wheel to the uppermost position by means of the cam surface 108 and the land 124, and a final counterclockwise movement of the cam 100 will lower the toggle link and idler wheel by means of the descending cam surface 109 back to the lowermost level or the 78 r.p.m. position.

As in the first embodiment of my invention, the flat speed indicating surfaces of the grip portion 102 indicated at A', B', C', and D' in Fig. 9 are adapted to rotate simultaneously with the cam 100 and the control rod 101 whereby the proper speed will be indicated relative to a selected common point within ready view of the operator. In this second embodiment, shifting of the turntable drive mechanism from one speed to another is accomplished by one quarter (¼) turn of the control rod 101. The gear and pinion found in the first embodiment of my invention is eliminated in this form and a simplified mechanism for accomplishing the speed shift from the turntable spindle is provided. As in the first embodiment, the speed shifts are preferably made while the turntable is in motion, and the action of the idler wheel tread shown at 95 and beveled at 95a is the same as in the first embodiment.

The third embodiment of my invention as illustrated in Figs. 12–15 inclusive closely resembles the first embodiment as shown in Figs. 1–6, said third embodiment having certain modifications and improvements herein later to be fully described.

Figure 12:
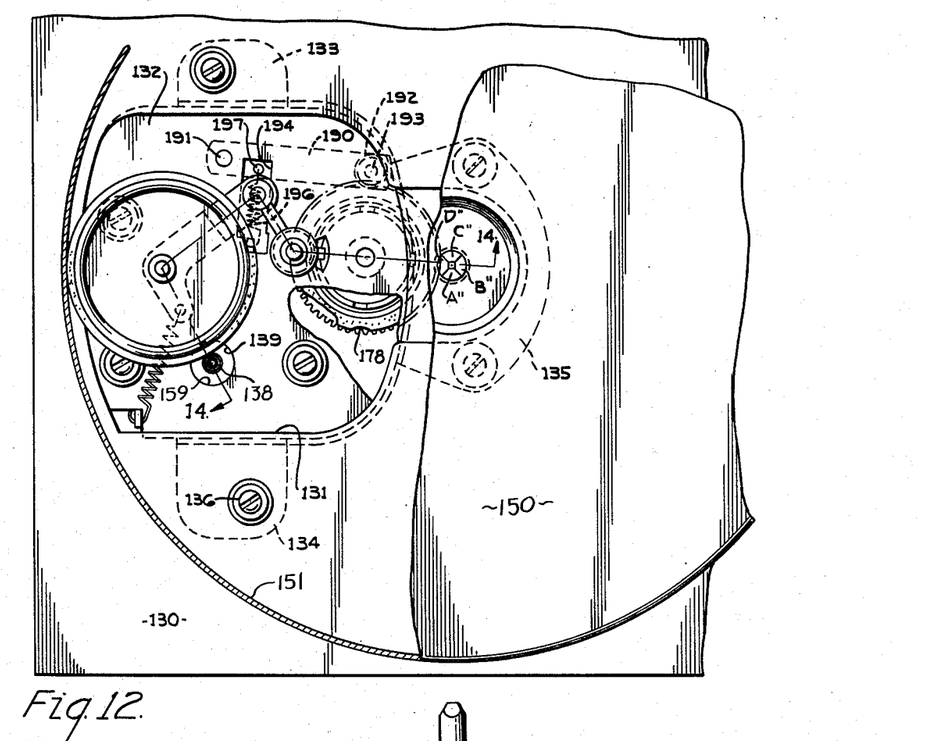
Fig. 12 is a view similar to Figs. 1 and 7 showing a third embodiment of my invention.
Figure 13:
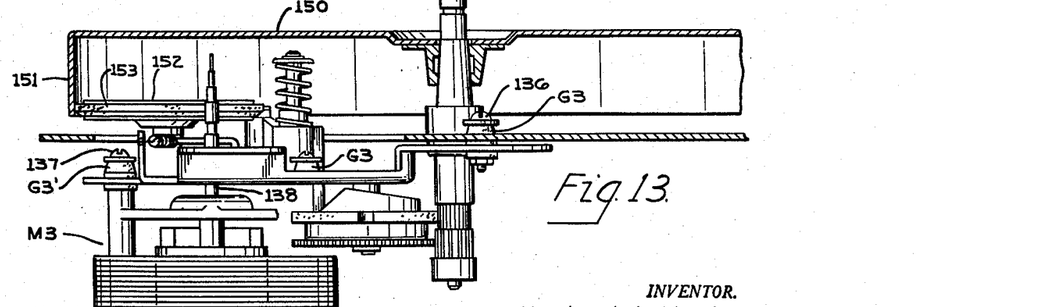
Fig. 13 is a view similar to Figs. 2 and 8 showing a side elevation of said third embodiment of my invention.

Referring now to Fig. 12, at 130 I provide a primary mounting plate having a portion thereof cut away as indicated at 131 beneath which is resiliently suspended a motor mounting plate 132. The motor mounting plate 132 is provided with ear members 133, 134, and 135, substantially similar to the motor mounting ear members of the first and second embodiments of my invention. Said ear members provide means by which the motor mounting plate is mounted to the primary mounting plate 130 having the conventional bolt 136 and rubber grommets G3 for this purpose. The opening formed at 131 is irregular in shape and so contoured that all of the operating parts of the motor mounting plate 132 are preferably enabled to project vertically upwardly above the plane of the primary mounting plate 130. A motor M3 is suspended in conventional manner beneath the motor mounting plate 132 by means of bolts 137 and resilient grommets G3'. Said motor is provided with a vertically upwardly extending rotor shaft 138 which extends upwardly through an aperture 159 in the motor mounting plate 132, and said rotor shaft is provided at its uppermost end with a plurality of upwardly inwardly stepped pulley drive portions 140, 141, 142, and 143.

A spindle 145 is rotatably mounted upon the ear member 135 by means of a bearing 146 rigidly mounted in said ear member. The spindle 145 provides mounting means for a turntable 150, said turntable being of the type having a depending peripheral flange 151. As in the previous embodiments of my invention, it will be understood that the turntable 150 overlies and is spaced slightly upwardly from the turntable driving mechanism with the flange 151 being spaced a substantial distance from the rotor shaft 138 and the pulley drive portions 140, 141, 142, and 143.

Figures 14, 15:
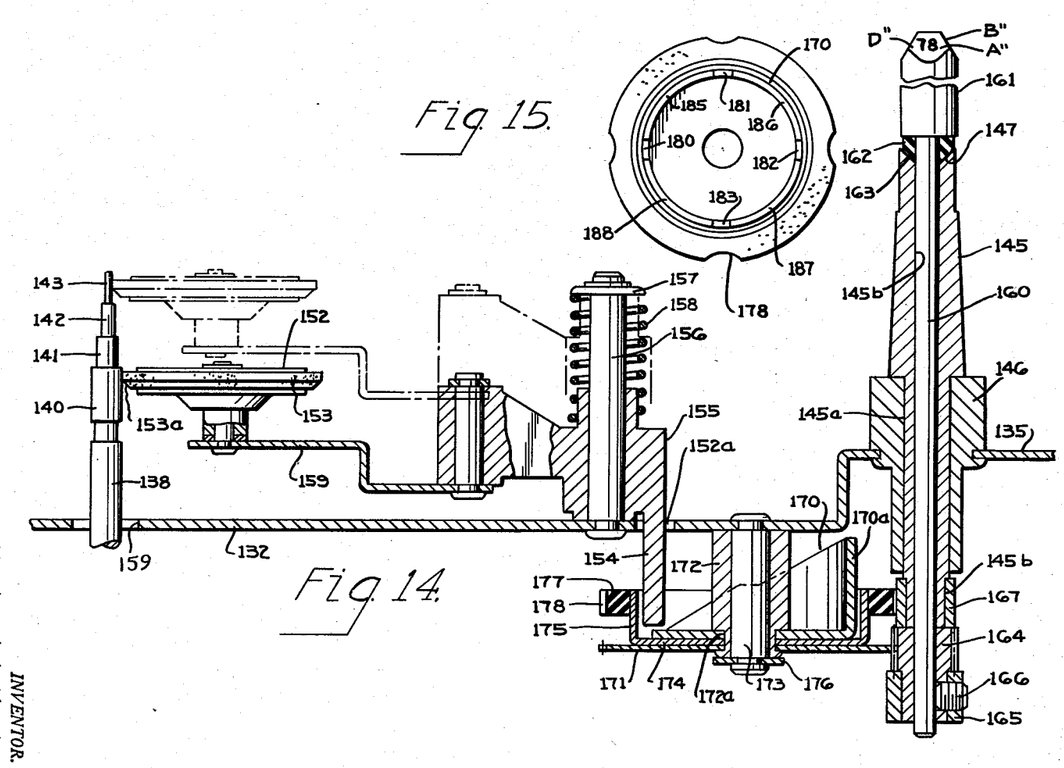
Fig. 14 is a view taken along the line 14—14 of Fig. 12.
Fig. 15 is a top plan view of the cam of the third embodiment of my invention.

A vertically and horizontally movable idler wheel 152 having a resilient peripheral tread 153 is so disposed that the periphery thereof is adapted to engage a selected one of the pulley drive portions and the turntable flange. As best shown in Fig. 14, it will be seen that the means for mounting the idler wheel 152 is substantially the same as that found in the first two embodiments of my invention and needs no detailed description. Briefly, it comprises a toggle link 155 vertically mounted upon an upstanding stud 156 secured to the motor mounting plate 132, said toggle link being downwardly resiliently biased by means of a spring 158 captively maintained upon the stud 156 by means of a retainer 157. An articulated arm 159 is pivoted at one end thereof to the toggle link 155 and provides at the opposite end thereof mounting support for the idler wheel 152.

As hereinbefore described, the idler wheel 152 is adapted to be selectively moved from the plane of the lowermost relatively largest diameter pulley drive portion 140 through successive steps of different diameters, viz. 141, 142, and 143 to drive the turntable 150 at different selected rotative speeds. Said idler wheel is also adapted to move downwardly from the smallest to the relatively larger diameter step or the pulley drive portion to drive the turntable at different speeds preferably while the turntable is in motion, and is aided in this movement by beveling as at 153a lower edge of the peripheral resilient tread 153 in a manner hereinbefore set forth.

The spindle 145 is seated within the bearing 146 by means of a downwardly directed, diametrically reduced journal portion 145a and is provided with a concentric bore 145b. The uppermost end of the spindle 145 is inwardly circumferentially beveled as indicated at 147. A control rod 160 is rotatably telescoped through the bored spindle 145, the lowermost end of said rod projecting downwardly beyond the journal 145a. The uppermost end of the control rod 160 is provided with an enlarged grip portion 161. As in the first two embodiments of my invention, said grip portion is provided with four upwardly tapering flat surfaces, generally indicated at A", B", C", and D" upon which speed indicating numbers 78, 45, 33 and 16 respectively are imprinted. It will also be noted, as before, that the speed indicating numbers of the surfaces are adapted to be viewed by the operator from some clearly indicated point of reference on the phonograph whereby said numbers indicate the speed at which the turntable is being driven.

Interposed between the grip portion 161 and the spindle 145, I provide a resilient washer or clutch member 162 manufactured of rubber, neoprene, or the like material. The clutch member 162 is provided at the lowermost portion thereof with circumferential bevel at 163 adapted to complementarily interfit the inwardly directed bevel 147 of the spindle 145. From the foregoing, it will be understood that, as in the first embodiment of my invention, means is provided whereby the control rod 160 may be pressed downwardly at the grip portion 161 to engage the spindle 145 whereby said spindle and said control rod are caused to rotate in unison. The clutch member 162 is, however, adapted to operate in cooperation with other parts of the speed changing mechanism in a unique manner to be herein later more fully described.

The lowermost end of the control rod 160 is provided with a pinion 164 through which said rod is adapted to rotate a cam 170 through a gear 171 unitarily pivotally mounted with said cam. The cam 170 is of the circular type, found in the first two embodiments of my invention having an upstanding wall portion 170a of varying heights adapted to cam the toggle link 155 upwardly by means of a downwardly directed cam follower 154 integrally formed with the link 155 and projecting downwardly through an arcuate slot 152a in the motor mounting plate 132 and disposed above the cam 170 and adapted to engage the camming surfaces thereof.

The pinion 164 is press fitted into a retainer ring 165 and rigidly secured to the control rod 160 by means of a set screw 166 threaded through said retainer ring and the pinion 164. The lowermost end of the journal 145a of the spindle 145 is further diametrically reduced at 145b and has press fitted thereupon a serrated friction drive ring 167. The uppermost end of the pinion 164 abuts the lowermost end of the reduced portion 145b and the drive ring 167. It will be clearly seen that the drive ring 167 rotates with the spindle 145 and that the pinion 164 rotates with the control rod 160.

The cam 170 and the gear 171 are rigidly fixed to the lowermost end of a hub 172 journaled upon a downwardly directed stud 173 rigidly and dependently affixed to the motor mounting plate 132. Said cam and gear are unitarily mounted to the hub 172 with a drive pulley cup 174. The pulley cup 174 is provided with an upwardly directed, circumferentially continuous flange 175, and the cam 170 is concentrically nested within said cup. The gear 171 is contiguously positioned adjacent the lowermost surface of said pulley cup 174 and all of said parts are concentrically apertured to telescope over a downwardly directed, diametrically reduced collar 172a of the hub 172. The edges of the collar 172a are then rolled over the gear 171 in a conventional manner to complete the assembly. A snap ring 176 mounted to the lowermost end of the stud 173 retains the entire assembly upon said stud. It will be noted that the upwardly extending flange 175 of the pulley cup 174 is radially outwardly spaced from the periphery of the cam 170 sufficiently to allow the cam follower 154 to abut the uppermost edge of the wall portion 170a of said cam 170. Adjacent the upper edge of the flange 175 said detent cam member is provided with a resilient tire 177 rigidly secured thereto, preferably by means of a suitable adhesive compound. The tire 177 is provided with circumferentially interspaced notches 178 in the outer periphery thereof. The notches 178 are circumferentially interspaced at 90° intervals, each of said notches corresponding with one of the levels at which the idler wheel 152 is adapted to be disposed. The outer periphery of the tire 177 is adapted to frictionally contact the drive ring 167 surrounding the reduced portion 145b of the spindle 145, and the notches 178 are of such curvature that when they are positioned adjacent said detent ring, the inner concave surfaces of said notches are slightly interspaced from said detent ring. It will be seen, therefore, that when the turntable 145 and the drive ring 167 are rotating, the tire 177, and therefore the pulley cup 174, is rotated therewith until one of said notches reaches said drive ring at which point the spindle 145 rotates freely without rotating the tire 177.

As best shown in Fig. 15, the cam 170 is provided with a plurality of circumferentially disposed upwardly directed cam surfaces and lands substantially the same as those found in the first embodiment of my invention. The lands are designated 181, 182, and 183 respectively in a clockwise direction, the cam wall 170a being notched at the position 180 at which point the toggle link 155 is resting upon the upper surface of the motor mounting plate 132 and the depending cam follower 154 is slightly spaced above the base of the cam 170. Ascending cam surfaces, 185, 186, and 187 respectively interconnect the notch 180 and the lands 181, 182 and 183, and descending cam 188 connects the land 183 to the position shown at 180.

To aid in maintaining the recited mechanism in position to drive the turntable at any selected speed wherein the drive ring 167 is aligned with one of the notches 178, I provide spring biased detent means.

I have illustrated in Fig. 12 a detent arm 190 pivotally secured at one end thereof to the lowermost side of the motor mounting plate 132 by means of a rivet 191. The opposite end of the detent arm 190 is adapted to be disposed adjacent the periphery of the tire 177 and is provided with a roller 192 rotatably monted upon a downwardly projecting pivot 193 of said detent arm. The roller 192 is of such diameter as to complementarily interfit the notches 178 in the tire 177. A generally rectangular opening or aperture 194 is provided in the mounting plate 132, perpendicular to and overlapping a portion of the detent arm 190. The aperture 194 is provided at the end thereof opposite the detent arm 190 with a downwardly projecting anchor lug 195 formed from the metal of the motor mounting plate and bent downwardly. A coil spring 196 is connected at one end thereof to the anchor lug 195 at the opposite end thereof to the arm 190 by means of an aperture 197 in said arm. The spring 196 is connected to the arm 190 intermediate the rivet 191 and the roller 192 and is adapted to resiliently urge the roller 192 into the peripheral notches 178 of the tire 177. The roller 192 enters one of the notches 178 synchronously with the alignment of the drive ring with an adjacent one of said notches.

The above described third embodiment of my invention is primarily adapted to effect a speed change in the turntable during rotation of said turntable and has the added advantage of making such change automatically rather than by manual turning of the control rod 160 by the operator. To make a speed change, the operator merely presses downwardly upon the upper end of the control rod 160 and the remainder of the speed change operation is accomplished by the rotative power of the turntable 150.

The automatic speed changing feature of the third embodiment operates through the clutch washer 162, the drive ring 167, and the tire 177. Ordinarily when in operation, the turntable 150 rotates upon and unitarily with the spindle 145 which turns freely within the bearing 146. The control rod 160 remains stationary relative to the spindle 145 due to the resistance offered by the gear 171 and the detent arm and roller 190 and 192 respectively. The drive ring 167 rotates freely relative to the tire 177 because it is positioned in alignment with one of the notches 178 and is, therefore, not in contact with said tire.

When the operator presses downwardly upon the grip portion 161, the clutch washer 162 causes frictional engagement between the control rod 160 and the spindle 145. This causes said control rod to rotate slightly thereby rotating the pinion 164. The pinion 164 turns the cam 170, the pulley cup 174, and the tire 177. Rotation of said tire disaligns the adjacent notch 178 with the drive ring 167 whereby the peripheral surface of said tire which is between the notches engages said drive ring. Since the drive ring 167 is mounted to rotate unitarily with the spindle 145, the rotation of said spindle will drive the cam 170 through the tire 177 until said drive ring is aligned with the next successive one of the notches 178.

The mechanism will continue to change speeds as long as pressure is applied by the operator. Therefore, to change from one speed to the next successive speed, it is only necessary that the operator apply a momentary pressure upon the grip portion 161 to begin the changing cycle. Because the lifting cam 170 is circularly disposed, the speed change mechanism will successively drive the turntable through the plurality of different speeds in response to successive applications of pressure upon the control rod in a predetermined sequence, repeating this sequence indefinitely as desired by the operator without change in the movement of rotation of said cam.

In Figs. 16 through 19 I show a fourth embodiment of my invention which is similar to and embodies some of the features of the third embodiment of my invention as shown in Figs. 12 through 15. The illustrations have been limited to disclosing the spindle, control rod, and the cam unit, it being understood that the turntable, drive shaft, idler wheel, and idler wheel mount are all identical with those shown in the previous embodiments. It will also be understood that in this fourth embodiment, the idler wheel mount, and therefore, the idler wheel itself is vertically moved by rotation of a circular cam having upwardly disposed cam surfaces adapted to coact with a depending cam follower of the toggle link as in the previous forms.

Figures 16, 17:
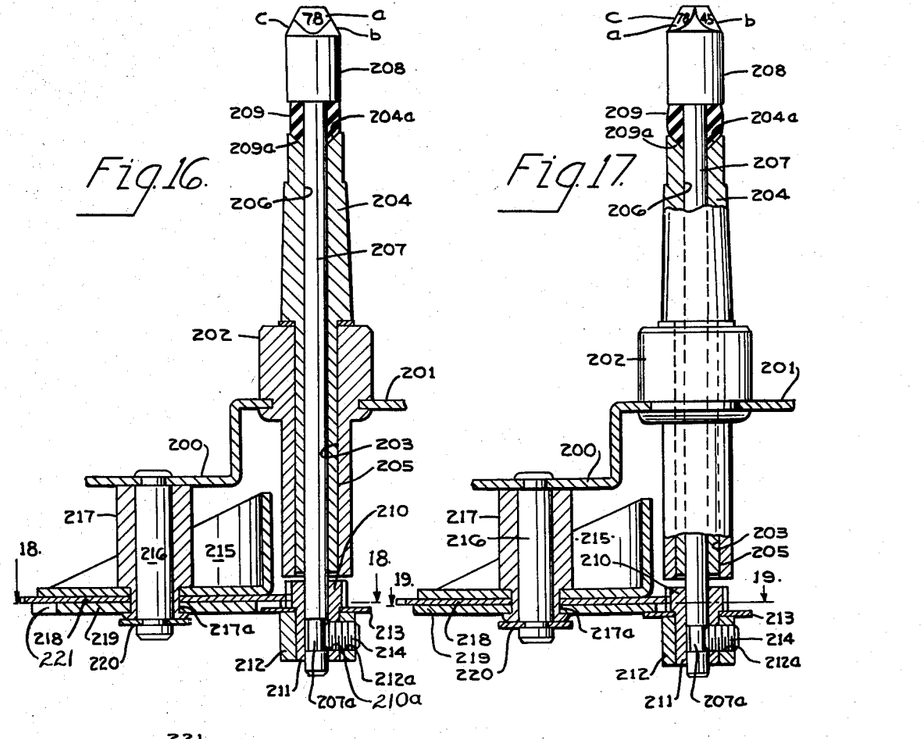
Fig. 16 is a fragmentary sectional view similar to Figs. 3, 10, and 14 showing a fourth embodiment of my invention.
Fig. 17 is a view similar to Fig. 16 showing the mechanism thereof in a different position.

Referring now to Fig. 16, at 200 I show a motor mounting plate similar to the motor mounting plate 132 of Fig. 14. One of the ear members 201 of said mounting plate is upwardly offset as in the previous embodiments and has mounted therein a turntable spindle bearing 202 having a concentric longitudinal bore 203 therethrough. A spindle 204 is provided with a lowermost, diametrically reduced portion 205 by which said spindle is rotatably telescoped within the bore 203 of the bearing 202. Said spindle is longitudinally, concentrically apertured as indicated at 206, and a control rod 207 slidably and rotatably projects through said aperture 206. The control rod 207 projects beyond the spindle 204 in both an upward and downward direction, the uppermost end of said control rod being provided with an enlarged grip portion 208 having upwardly converging flat surfaces a, b, c, etc. which carry the speed indicating numbers as shown in embodiments 1, 2, and 3.

The uppermost end of the spindle 204 is vertically interspaced from the grip portion 208 and is provided with a circumferentially continuous, inner bevel 204a. A tubular clutch washer 209 is telescoped over the control rod 207 adjacent the grip portion 208 and is provided with an outwardly beveled surface 209a at its lowermost end adapted to complementarily interfit the bevel 204a of the spindle 204. The clutch washer 209 operates in a manner similar to the clutch washer 162 of Fig. 14 in that downward pressure on the grip portion 208, by means of said washer, effects a clutching engagement between the spindle 204 and the control rod 207 to cause said spindle and said control rod to rotate in unison.

The lowermost end of the control rod 207 has telescoped thereupon a pinion 210. The pinion 210 is provided with a downwardly directed, concentric collar portion 211 over which is slidably fitted a retainer ring 212. The retainer ring 212 is adapted to maintain a washer 213 adjacent the lower surface of the pinion 210. Said washer is telescoped over the collar portion 211 and securely interposed between the pinion 210 and the retainer ring 212. A set screw 214 is thread fitted through concentric apertures 210a and 212a in the pinion and retainer ring respectively, and is adapted to abut a reduced, waist portion 207a of the control rod 207. By means of the set screw 214, the pinion 210 is caused to rotate unitarily with the control rod 207 and by means of the retainer ring 212, the washer 213 is maintained against vertical displacement upon the collar 211 of the pinion 210.

The cam which is indicated at 215 is substantially similar in form and function to the cam 170 of Fig. 14 and need not be further detailed here. Said cam is also similarly mounted to the motor mounting plate 200, said mounting means comprising a vertically downwardly directed stud 216 having an elongated hub 217 rotatably telescoped thereupon. The hub 217 is provided at its lowermost end with a diametrically reduced, concentric collar portion 217a over which the cam 215 is telescoped.

A gear 218 and a detent plate 219 are unitarily mounted with the cam 215 upon the hub 217, all of the parts being rigidly secured to said hub by having the lowermost portion of the collar 217a rolled radially outwardly. A retainer ring 220 adjacent the lowermost end of the stud 216 maintains the hub and its associated parts upon said stud.

As best shown in Figs. 16 and 17, it will be noted that the gear 218, which is below and contiguous with the cam 215, meshes with the pinion 210. It will also be noted that the vertical dimension of the pinion 210 is substantially greater than that of the gear 218 whereby said pinion 210 can engage said gear in relatively different planes.

As shown in Fig. 16, the washer 213 ordinarily lies in a plane whereby the lowermost surface of said washer is at the same level as the lowermost surface of the detent plate 219, but said washer can be lowered below the level of said detent plate. The peripheral edges of the washer 213 and the detent plate 219 overlap each other, and said detent plate is provided with a plurality of circumferentially spaced notches 221 whereby said washer 213 can maintain the position of Fig. 16 when one of said notches is aligned with said washer. By referring to Fig. 18, it will be noted that the notches 221 are formed on such a radius that the periphery of the washer 213 is slightly spaced from the concave edge of the adjacent notch sufficiently to allow said washer to move vertically into and out of said notches. When the washer 213 is positioned in a notch 221, the cam 215 is locked against rotation, and when said washer is moved out of said notch, said cam can rotate in response to movement of the pinion 210.

The clutch washer 209 is of resilient material, such as rubber or neoprene, which can be compressed a substantial amount to enable the control rod 207 to be moved downwardly through the bore 206 of the spindle 204 a slight distance. When, therefore, the control rod 207 is pressed downwardly by means of the grip portion 208, not only is said control rod caused to rotate with the spindle 204 as described above, but the washer 213 is moved downwardly below the level of the detent plate 219.

The present embodiment of my device is of the automatic type similar in operation to that shown in Fig. 14, and is preferably actuated while the turntable is in motion. As in the third embodiment of my invention, the speed change is accomplished through the various speeds in a pre-determined sequence by means of a momentary downward pressure exerted upon the control rod 207 by means of the grip portion 208. Assuming that the device is in the position of Fig. 16 whereby the washer 213 is aligned with one of the notches 221 and during which time the spindle 204 turns freely relative to said control rod, the operator presses downwardly on the grip portion 208 thereby simultaneously engaging the spindle with the control rod and lowering the washer 213 below the detent plate 219. This causes said control rod and said spindle to rotate unitarily. The control rod, through the pinion 210, rotates the gear 218 and with said gear the cam 215 and the detent plate 219. The effect of rotating the cam 215 is already well understood and need not be repeated here. Rotation of the detent plate 219 causes the adjacent notch 221 to move out of alignment with the washer 213, and because said washer and said detent plate overlap in a horizontal direction, said washer is held beneath the detent plate until said detent plate is rotated to the position where the next successive of the notches 221 is aligned with said washer. Since the washer 213 is fixed to move vertically with the control rod 207, the detent plate 219 holds the control rod 207 downwardly against the resilient clutch washer 209 and the clutching engagement between said control rod and the spindle 204 is maintained.

Figure 18:
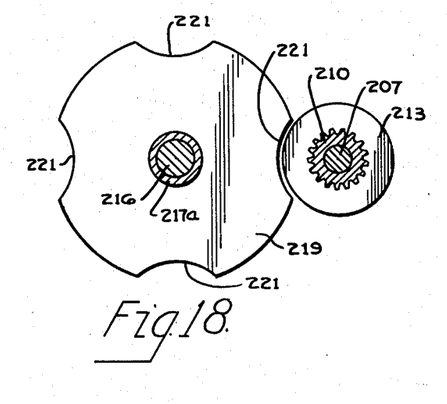
Fig. 18 is a view taken along the line 18—18 of Fig. 16.
Figure 19:
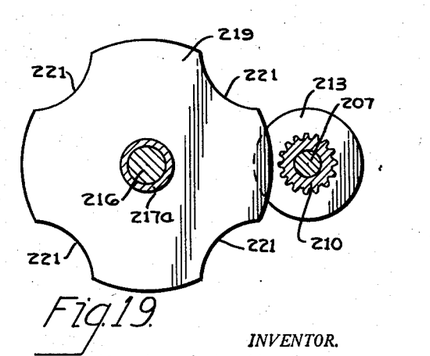
Fig. 19 is a view taken along the line 19—19 of Fig. 17.

By comparing Figs. 18 and 19, it will be readily seen that the spindle 204 will continue to drive the control rod 207, the pinion 210, and the cam gear detent assembly 215—218—219 until such time as the washer 213 again becomes aligned with one of the notches 221. When this happens the washer 213 will move upwardly into said notch because of the upward bias of the compressed clutch washer 209. This will cause the detent plate 219 to be locked against rotation and the gear 218 and the cam 215 will stop rotating; the spindle 204 then rotates freely again. Engagement between the gear 218 and the pinion 210 is maintained throughout the vertical movement of said pinion and the rod 207 due to the fact that said pinion is of greater dimension than the gear 218, and the two do not become disengaged. If the operator wishes to rotate the turntable at the next determined speed, he may do so by again pressing downwardly on the control rod 207 at which time the above described sequence of events will take place and the speed change mechanism will automatically move to the next speed.

It will be understood that the notches 221 correspond to appropriate lands on the cam 215 which are in turn adapted to position the idler wheel at the proper level for rotating the turntable at the speed desired by the operator and as indicated by the indicia on the flat surfaces, a, b, c, etc. It will also be understood that the mechanisms in both embodiment number three and embodiment number four may be actuated while the turntable is not being mechanically driven. This can be done by firmly gripping the grip portion (161 or 208) and pressing downwardly while at the same time rotating it. The operator can thereby manually rotate the turntable as well as the cam and cause the speed change sequence described.

All three embodiments of my invention provide a simple and direct means for effecting speed change in the phonograph by a single control knob located in the most convenient possible place, at the turntable spindle. The speed change can be made while the phonograph is in operation regardless of whether or not a phonograph record is mounted upon the turntable spindle.

It will be understood that many departures from the details of my invention as it is herein described and illustrated may be made, such as changes in the size and dimension, type of drive, etc. without, however, departing from the spirit of my invention or the scope of the appended claims.

What I claim is:

1. A plural speed turntable driving mechanism comprising a spindle, a turntable mounted on said spindle, said spindle provided with longitudinal passage means therethrough, a control rod rotatably positioned in said passage means, a motor, plural speed transmission means associated with said motor and said turntable having parts thereof shiftable to different interrelated positions to drive said turntable at different speeds, and a cam adapted to rotate in response to rotation of said control rod and adapted to cammingly move said shiftable parts of said transmission means to drive said turntable at different speeds.

2. A plural speed turntable driving mechanism comprising a spindle, a turntable mounted on said spindle, said spindle provided with a longitudinal passage therethrough, a control rod rotatably positioned within said passage, a motor, said motor having a diametrically stepped rotor shaft providing drive pulley portions of different diameters disposed at different levels, an idler wheel, a vertically movable mount for said idler wheel, said idler wheel being adapted by means of said mount to be selectively positioned at the different levels of said drive pulley portions, a cam rotatable in response to rotation of said control rod, said idler wheel mount having a cam follower adapted to cooperate with said cam whereby when said cam is rotated by means of said control rod, said idler wheel mount and idler wheel are vertically moved to the different levels of the said drive pulley portions.

3. A plural speed turntable driving mechanism as set forth in claim 2 whereby the uppermost end of said control rod is provided with a grip portion having a plurality of differently directed surfaces, speed indicating indicia imprinted upon said surfaces, said surfaces so arranged that when said idler wheel is driving said turntable at a pre-determined speed, the number corresponding to that speed is disposed to be viewed from a pre-determined vantage point.

4. A plural speed turntable driving mechanism comprising a spindle, a turntable rotatably mounted upon said spindle, a motor, a plural speed transmission means driven by said motor, said plural speed transmission means adapted to drive said turntable and having parts thereof shiftable to different interrelated positions to drive said turntable at different speeds, said spindle having a concentric bore therethrough, a rotatable control rod positioned within said bore and projecting above and below said spindle, the lowermost end of said control rod having a cam mounted thereupon, said cam rotatable with said control rod and adapted to cammingly move said shiftable parts of said transmission means to drive said turntable at different speeds.

5. A plural speed turntable driving mechanism comprising a spindle, a turntable rotatably mounted upon said spindle, said spindle having a concentric bore therethrough, a rotatable control rod positioned within said bore, a motor driven plural speed transmission means associated with said turntable having parts thereof shiftable to different interrelated positions to drive said turntable at different speeds, said control rod projecting below said spindle and having a cam mounted thereupon, a detent plate mounted to rotate unitarily with said control rod, said detent plate being notched at a plurality of circumferentially interspaced portions at the periphery thereof, spring biased detent means adapted to engage said notches to frictionally retain said detent plate and said cam in a plurality of pre-determined circumferential positions, said cam adapted to cammingly move said shiftable parts of said transmission means to drive said turntable at different speeds, said detent means engaging said detent plate notches at points corresponding to the circumferential positions at which said cam disposed said shiftable parts of said transmission means to drive said turntable at pre-determined different speeds.

6. A plural speed turntable driving mechanism as set forth in claim 5 wherein the recited control rod projects upwardly above said spindle, grip means associated with the uppermost end of said control rod, said grip means having a plurality of differently directed surfaces having imprinted thereupon different speed indicating indicia, said indicia so arranged and adapted as to indicate the speed at which the turntable is being driven during each position of the plural speed transmission means.

7. A plural speed turntable driving mechanism comprising a spindle, a turntable rotatably mounted upon said spindle, said spindle being concentrically longitudinally bored, a control rod positioned within said bore and rotatable relative to said spindle, a motor driven plural speed transmission means having parts thereof shiftable to different interrelated positions to drive the turntable at different speeds, said control rod projecting downwardly below said spindle, a pinion mounted upon the lowermost end of said control rod and adapted to rotate therewith, a gear and cam unitarily mounted for rotation upon a stud whose axis is parallel with and interspaced from the axis of said control rod, said gear intermeshing with said pinion whereby the rotation of said control rod affects rotation of said cam, and said cam adapted to cammingly move said shiftable parts of said transmission means to drive said turntable at different speeds.

8. A plural speed turntable driving mechanism comprising a spindle, a turntable rotatably mounted upon said spindle, said spindle being longitudinally concentrically bored, a control rod positioned rotatably within said bore, a motor having a vertically upwardly projecting, diametrically stepped rotor shaft, an idler wheel, a mount for said idler wheel, said mount being vertically movable to dispose said idler wheel at the different levels provided by said stepped rotor shaft, said idler wheel adapted to simultaneously frictionally engage one of the stepped portions of said rotor shaft and said turntable to drive said turntable at a pre-determined speed, a pinion mounted upon said control rod, a gear and cam unitarily mounted to rotate upon a stud whose axis is parallel to and interspaced from the axis of said control rod, said idler wheel mount having cam follower means thereon, the uppermost end of said control rod projecting above said spindle and being provided thereupon with speed indicating numerals, said gear and said pinion being intermeshed whereby the rotation of said control rod rotates said gear and cam, said cam adapted to cammingly position said idler wheel at different levels corresponding to the levels of the stepped rotor shaft, the proper speed indicia on the control rod being adapted to be exposed in a pre-determined direction to indicate the speed at which the turntable is being rotated.

9. A plural speed turntable driving mechanism comprising a spindle, a turntable mounted for rotation upon said spindle, said spindle having a longitudinally concentric bore therethrough, a control rod rotatably and longitudinally slidably mounted within said spindle, a motor driven plural speed transmission means having parts thereof shiftable to different interrelated positions to drive said turntable at different speeds, said control rod projecting downwardly below said spindle and having a pinion mounted thereupon, a gear, cam, and detent plate unitarily mounted for rotation separately from said control rod whereby said gear meshes with said pinion, a spring biased detent, said detent plate having a plurality of circumferentially interspaced notches at the periphery thereof adapted to receive said detent, a cam follower associated with said shiftable parts of said plural speed transmission means, said cam adapted by rotation thereof to shift said shiftable parts of said plural speed transmission means by means of said cam follower in response to rotation of said control rod, the uppermost edge of said spindle being transversely notched, a transversely directed clutch pin securely mounted to said control rod above said spindle, a resilient washer member interposed between said clutch pin and said spindle upon said control rod, said washer adapted to normally bias said control rod upwardly whereby said clutch pin does not engage said notch in said spindle, said washer being deformable whereby said control rod may be pressed downwardly to cause said clutch pin to engage said notch in said spindle whereby said control rod and said control spindle rotate unitarily.

10. A plural speed turntable driving mechanism comprising a spindle, a turntable mounted for rotation upon said spindle, said spindle having a longitudinal bore therethrough, a control rod rotatably and longitudinally slidably mounted within said spindle, a motor having a diametrically stepped rotor shaft providing pulley drive portions of different diameters adapted to drive the turntable at different speeds, an idler wheel, a vertically movable mount for said idler wheel, said idler wheel adapted to simultaneously engage said rotor shaft at one of the drive pulley portions thereof and said turntable, a pinion mounted to the lowermost end of said control rod and adapted to rotate therewith, a gear, cam, and detent plate unitarily rotatably mounted upon a stud whose axis is parallel with and interspaced from the axis of said control rod, said gear intermeshing with said pinion whereby said gear, cam, and detent plate are rotatable by means of said control rod, said detent plate being notched at circumferentially interspaced intervals at the periphery thereof, a spring biased detent adapted to resiliently engage said notches of said detent plate, said idler wheel mount having a cam follower adapted to cooperatively engage said cam whereby when said cam is rotated, said mount and said idler wheel are vertically moved to position the idler wheel at the different levels of said pulley drive portions of said rotor shaft, the uppermost edge of said spindle being notched, a transverse clutch pin rigidly mounted to said control rod and adapted to complementarily interfit said notch of said spindle, a resilient washer telescoped over said control rod and interposed between said clutch pin and said spindle whereby said clutch pin is ordinarily biased in an upward direction out of engagement with said notch in said spindle, said control rod movable in a downward direction against the bias of said resilient washer whereby said clutch pin engages the notch in said spindle to cause said spindle and said control rod to rotate unitarily.

11. A plural speed turntable driving mechanism comprising a hollow spindle, a turntable mounted for rotation upon said spindle, a control rod rotatably and longitudinally slidably mounted within said spindle, a motor driven plural speed transmission means having parts thereof shiftable to different interrelated positions to transmit rotation from the motor to said turntable at different speeds, a pinion mounted upon the lowermost end of said control rod, a drive ring mounted to the lowermost end of said spindle, a pulley member, gear, and cam unitarily mounted to rotate separately from said spindle, said gear meshing with said pinion, said pulley member having a peripheral tread adapted to engage said drive ring, said pulley member having a plurality of circumferentially interspaced notches at the periphery thereof, said drive ring being out of engagement with the peripheral tread of said pulley member when said drive ring is aligned with one of said notches, clutch means between said control rod and said spindle, cam follower means associated with said shiftable parts of said plural speed transmission means, said cam follower means adapted to cooperatively engage said cam whereby when said cam is rotated said shiftable parts are shifted thereby, said spindle ordinarily freely rotatable relative to said control rod and upon actuation of said clutch means adapted to cause rotation of said control rod, rotation of said gear, cam, and pulley member, rotating the adjacent one of said notches out of alignment with said drive ring to cause said drive ring to engage the periphery of said pulley member, the engagement of said drive ring with said peripheral tread causing continued rotation of said pulley member, gear and cam until another one of said notches becomes aligned with said drive ring, said cam adapted to position said shiftable parts of said plural speed transmission to drive the turntable at pre-determined speeds corresponding to the notches in said peripheral tread of said pulley member.

12. A plural speed turntable driving mechanism mounted upon a phonograph comprising a spindle, a turntable mounted upon said spindle, said spindle having a longitudinal concentric bore therethrough, a control rod slidably and rotatably mounted within said spindle, a motor having a rotor shaft providing drive pulley portions of different diameters adapted to drive a turntable at different pre-determined speeds, an idler wheel and a vertically movable mount therefor, said idler wheel adapted to simultaneously engage said turntable and one of said drive pulley portions of said rotor shaft to transmit rotation from said motor to said turntable, said control rod projecting upwardly above and downwardly below said spindle, a pinion mounted upon the lowermost end of said control rod, a drive ring mounted upon the lowermost end of said spindle, a pulley member, gear, and cam unitarily mounted for rotation upon said phonograph separately from said spindle, said gear meshing with said pinion, said idler wheel mount having a cam follower engaging said cam whereby when said cam is rotated said idler wheel mount is moved vertically to position said idler wheel at different levels to engage different of said drive pulley portions, said cam having land portions circumferentially interspaced and corresponding to the different levels of said drive pulley portions, said pulley member having a peripheral tread engageable with said drive ring, said peripheral tread having circumferentially interspaced notches adapted to disengage said peripheral tread from said drive ring at pre-determined rotative positions of said pulley member, clutch means interposed between said control rod and said spindle actuable to cause said control rod and said spindle to rotate unitarily, the uppermost end of said control rod having speed change indicia imprinted thereupon adapted to indicate the speed at which said turntable is being rotated, said spindle ordinarily freely rotatable relative to said control rod with said drive ring positioned within one of said notches in the peripheral tread of said pulley member, actuation of said clutch means causing said gear to be rotated by said pinion whereby the adjacent notch in said peripheral tread of said pulley member is rotated out of alignment with said drive ring to cause said peripheral tread to engage said drive ring and be driven thereby to the next successive notch and during which the cam cammingly moves the idler wheel mount to bring the idler wheel into engagement with another of said drive pulley portions and wherein the recited speed change indicia concomitantly exposes the speed indicating number corresponding to the speed at which the turntable is being driven.

13. A plural speed turntable driving mechanism as set forth in claim 12 wherein the recited clutch means comprise a resilient clutch washer telescoped upon said control rod, the uppermost end of said control rod being provided with a clutching surface adapted to engage said clutch washer, the uppermost end of said spindle being inwardly beveled, the lowermost edge of said clutch washer being outwardly beveled and adapted to complementarily interfit the inner bevel of said spindle, said clutch member being actuated by means of pressure exerted downwardly upon the uppermost end of said control rod.

14. A plural speed turntable driving mechanism as set forth in claim 12 having a spring biased detent, said detent adapted to resiliently engage one of said notches in the peripheral tread of said pulley member concurrently with the alignment of said drive ring with another of said notches.

15. A plural speed turntable driving mechanism comprising a spindle, a turntable rotatably mounted upon said spindle, said spindle having a longitudinal concentric bore therethrough, a control rod slidably and rotatably mounted within said spindle, motor driven plural speed transmission means having parts thereof shiftable to different interrelated positons whereby it is adapted to drive said turntable at different speeds, a pinion securely mounted upon the lowermost end of said control rod, a cam, gear, and detent plate unitarily rotatably mounted upon a stud whose axis is interspaced from the axis of said control rod, said gear meshing with said pinion of said control rod, said detent plate being provided with a plurality of circumferentially interspaced notches at the periphery thereof, radially projecting detent means mounted for vertical movement with said control rod and adapted to project into said notches of said detent plate and to overlap the periphery of said detent plate, said spindle ordinarily rotating freely relative to said control rod, clutch means actuable in response to downward movement of said control rod whereby said spindle and said control rod are caused to rotate unitarily and whereby said detent means is moved below said detent plate, the rotation of said control rod rotating said detent plate whereby said detent means becomes disaligned with the adjacent notches in said detent plate and whereby the overlapping periphery of said detent plate maintains said detent means and said control rod in a lower position until said detent plate has rotated sufficiently to align another of said notches with said detent means after which said detent means moves upwardly into said second mentioned notch, said cam adapted to cammingly shift said shiftable parts to different pre-determined, interrelated positions corresponding in number and position to said notches in said detent plate.

16. A plural speed turntable driving mechanism as set forth in claim 15 wherein the recited control rod is provided with an enlarged portion at the uppermost end thereof, said spindle being inwardly beveled at the uppermost edge thereof, a compressible, resilient clutch member telescoped upon said control rod and interposed between the uppermost enlarged end of said control rod and said spindle, the lowermost edge of said clutch member being outwardly beveled and adapted to complementarily interfit the inner bevel of said spindle, said control rod sufficiently movable against the bias of said resilient clutch member to position said detent means below the level of said detent plate, said clutch member maintaining clutching engagement between said control rod and said spindle while said detent means is maintained beneath said detent plate and said clutch member becoming disengaged when said detent means enters the next successive said notches in response to the upward bias of said resilient clutch member.

17. A plural speed turntable driving mechanism comprising a plural speed transmission means having parts thereof shiftable to different interrelated positions, a turntable, said transmission means driving said turntable at different speeds by the shifting of said parts, bearing means mounted upon said mechanism, a control rod rotatably positioned within said bearing means, a cam adapted to rotate in response to rotation of said control rod and adapted to cammingly move said shiftable parts of said transmission means to drive said turntable at different speeds, a grip portion on the uppermost end of said control rod having a plurality of differently directed surfaces, speed indicating indicia imprinted upon said surfaces, said surfaces so arranged that when said transmission means is driving said turntable at a predetermined speed, a number corresponding to that speed is disposed to be viewed from a predetermined vantage point.

18. A plural speed turntable driving mechanism comprising a plural speed transmission means having parts thereof shiftable to different interrelated positions to transmit rotation from a motor to a turntable at different speeds, a turntable, rotatable means for shifting said parts to said different positions, a rotatable control rod mounted separately from said rotatable means, continuously connected drive means connecting said rod with said rotatable means and intermittent drive means connecting said turntable with said rotatable means, said intermittent drive means having neutral positions of disengagement with said turntable corresponding to said different positions of said parts, rotation of said control rod rotating said rotatable means through said continuously connected drive means whereby said intermittent drive means is moved into driving engagement with said turntable after which said turntable continues to drivingly rotate said rotatable means until said intermittent means reaches another of said neutral positions.

19. A plural speed turntable driving mechanism as set forth in claim 18 including clutch means between said rod and said turntable whereby actuation of said clutch means begins rotation of said control rod.

20. A plural speed turntable driving mechanism comprising a plural speed transmission means having parts thereof shiftable to different interrelated positions to transmit rotation from a motor to a turntable at different speeds, a turntable, rotatable means for shifting said parts to said different positions, a rotatable control rod mounted separately from said rotatable means, drive means connecting said rod with said rotatable means, clutch means connecting said rod with said turntable, retaining means for retaining said clutch in an engaged position, said retaining means having disengaged positions corresponding to said different positions of said parts and said different speeds, actuation of said clutch causing said rod to rotate with said turntable and concurrently causing actuation of said retainer means from a disengaged to an engaged position whereby said rod continues to rotate in response to rotation of said turntable until said retainer means is moved to another disengaged position during which motion said rotatable means is rotated by said rod and moves said parts to another of said different positions to change the speed of the turntable.

References Cited in the file of this patent

UNITED STATES PATENTS

| | | |
|---|---|---|
| 2,584,580 | Hardy | Feb. 5, 1952 |
| 2,801,546 | Scheller et al. | Aug. 6, 1957 |
| 2,826,925 | Singer | Mar. 18, 1958 |